US008081347B2

(12) United States Patent
Tamada et al.

(10) Patent No.: US 8,081,347 B2
(45) Date of Patent: Dec. 20, 2011

(54) IMAGE FORMING APPARATUS SUITABLE FOR RECYCLING SHEETS OF PAPER WITH IMAGES FORMED THEREON, AND METHOD AND PROGRAM PRODUCT FOR ADDING RECYCLING INFORMATION

(75) Inventors: Takeshi Tamada, Toyohashi (JP); Shinichi Yabuki, Toyokawa (JP); Junichi Masuda, Toyokawa (JP); Koji Ohara, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1013 days.

(21) Appl. No.: 11/503,165

(22) Filed: Aug. 14, 2006

(65) Prior Publication Data

US 2007/0236720 A1 Oct. 11, 2007

(30) Foreign Application Priority Data

Apr. 10, 2006 (JP) ................................ 2006-108104

(51) Int. Cl.
*H04N 1/40* (2006.01)
*G06K 1/00* (2006.01)

(52) U.S. Cl. ....................................... 358/3.28; 358/1.1

(58) Field of Classification Search .................. 358/1.1, 358/3.28

See application file for complete search history.

(56) References Cited

U.S. PATENT DOCUMENTS 6,373,575 B1 * 4/2002 Takayama et al. ............ 356/445
2004/0252314 A1 * 12/2004 Takahashi ...................... 358/1.1

FOREIGN PATENT DOCUMENTS

| | | | |
|---|---|---|---|
| JP | 9-33440 | A | 2/1997 |
| JP | 2001-051555 | | 2/2001 |
| JP | 2001-315415 | * | 11/2001 |
| JP | 2002-311753 | A | 10/2002 |
| JP | 2005-148240 | | 6/2005 |
| JP | 2005-157745 | | 6/2005 |
| JP | 2006-065798 | | 3/2006 |
| JP | 2006-267642 | | 10/2006 |

OTHER PUBLICATIONS

Machine translation of JP 2001-051555 to Yamamoto Hiroyuki.*

* cited by examiner

*Primary Examiner* — Benny Tieu
*Assistant Examiner* — Eric A Rust
(74) *Attorney, Agent, or Firm* — Buchanan Ingersoll & Rooney PC

(57) ABSTRACT

To facilitate sorting sheets of paper for recycling, a MFP includes an image data accepting portion to accept image data output from an image reader, a recycling information determining portion to determine recycling information corresponding to the image data, and an image forming portion to form an image of the image data together with the determined recycling information on a sheet of paper.

19 Claims, 15 Drawing Sheets

F I G. 1 3

| | | | | |
|---|---|---|---|---|
| RECYCLING CLASS OF BACK PAPER | COLORED PAPER | UNCOLORED PAPER | COLORED PAPER | UNCOLORED PAPER |
| RECYCLING CLASS OF IMAGE DATA | UNCOLORED PAPER | COLORED PAPER | COLORED PAPER | UNCOLORED PAPER |
| NEW RECYCLING CLASS | COLORED PAPER | COLORED PAPER | COLORED PAPER | UNCOLORED PAPER |

IMAGE FORMING APPARATUS SUITABLE FOR RECYCLING SHEETS OF PAPER WITH IMAGES FORMED THEREON, AND METHOD AND PROGRAM PRODUCT FOR ADDING RECYCLING INFORMATION

This application is based on Japanese Patent Application No. 2006-108104 filed with Japan Patent Office on Apr. 10, 2006, the entire content of which is hereby incorporated by reference.

BACKGROUND OF THE INVENTION

1. Field of the Invention

The present invention relates to an image forming apparatus, and a method and a program product to add recycling information. More particularly, the present invention relates to an image processing apparatus and a method and a program product to add recycling information, which are particularly applicable to recycling sheets of paper having images formed thereon.

2. Description of the Related Art

Recently, for the purpose of environmental protection, there is an ongoing trend of seeking the effective use of various types of resources. In particular, for the paper resource, the recycling system seems to have been almost established. To improve the quality of recycled paper, paper materials should be sorted before they are provided to the recycling process. Japanese Patent Laid-Open Publication No. 2002-311753 discloses an image forming apparatus which has a feature of printing the type of paper on transfer paper together with toner images. Because the type of paper is printed on transfer paper in the image forming apparatus, the operator of the apparatus can sort the sheets of transfer paper by visually inspecting the printed paper type.

Quality of the recycled paper, however, is largely affected by the amount of extra components, such as ink, toner or the like, which are included in the paper materials. If the paper materials contain less extra components other than paper component, the resulting recycled paper will have a higher quality. Therefore, it is desired to sort the paper materials according to the amount of extra components other than paper component. The criteria for sorting the sheets of paper can be determined quantitatively, but the amount of extra components has to be judged by human senses because the sorting job presently relies on manpower.

The problem of sorting the sheets of paper by humans is the disability to quantitatively measure the extra components other than paper component, which may cause erroneous sorting, such as sorting some sheets of paper into the group of low extra component content, although those sheets should have been sorted into the group of higher extra component content.

In the meantime, to aim for the effective use of paper resource, images may be formed on both sides of the sheet of paper. Also, it may be desired to use the sheet of paper having the image previously formed on one side thereof and that image being unnecessary (hereinafter referred to as "back paper") to form a new image on the other side thereof. To sort out such sheets of paper having images formed on both sides thereof, the operator must determine the amount of extra components through the visual inspection of the images, which may impede accurate sorting.

SUMMARY OF THE INVENTION

The present invention has been made to solve the problem set forth above, and one object of the present invention is to provide an image forming apparatus capable of forming an image which facilitates sorting sheets of paper for the recycling use.

Another object of the present invention is to provide a method and a program product to add recycling information, capable of forming an image which facilitates sorting sheets of paper for the recycling use.

To achieve the above objects, according to one aspect of the present invention, an image forming apparatus includes an image data acquiring portion to acquire image data, a recycling information determining portion to determine recycling information corresponding to the image data, and an image forming portion to form an image on a sheet of paper together with the recycling information.

In this aspect, the recycling information is determined corresponding to the image data and an image of the image data is formed on a sheet of paper together with the recycling information. Thus, an image forming apparatus capable of forming an image which facilitates sorting sheets of paper for recycling is provided.

According to another aspect of the present invention, a method of adding recycling information includes the steps of acquiring image data, determining recycling information corresponding to the image data, and forming an image of the image data on a sheet of paper together with the recycling information.

In this aspect, a method of adding recycling information capable of forming an image which facilitates sorting sheets of paper for recycling is provided.

According to still another aspect of the present invention, a program product of adding recycling information causes a computer to execute the steps of acquiring image data, determining recycling information corresponding to the image data, and forming an image of the image data on a sheet of paper together with the recycling information.

In this aspect, a program product of adding recycling information capable of forming an image which facilitates sorting sheets of paper for recycling is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is an example of a determination table;

DESCRIPTION OF THE PREFERRED EMBODIMENTS

Figure 1:
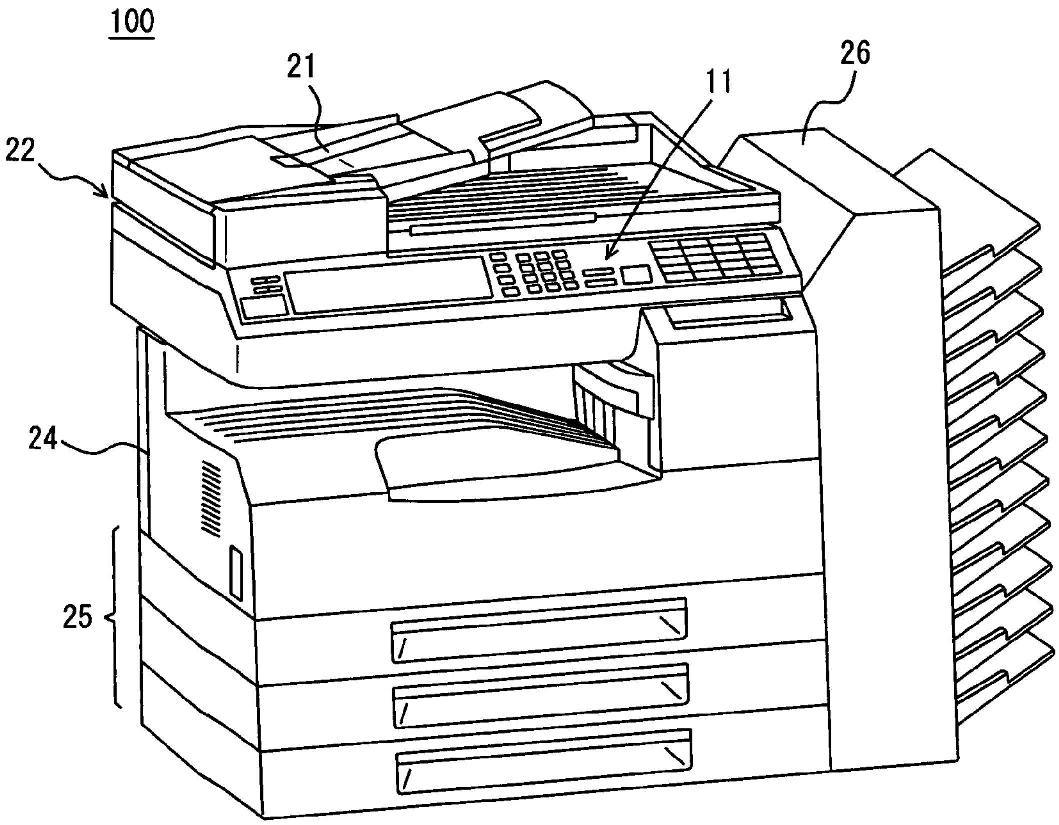
FIG. 1 is a perspective view showing an appearance of a MFP according to an embodiment of the present invention.

The present invention will be described below with reference to the accompanying drawings. In the drawings, like numerals indicate similar elements which are designated the same way and perform the same function, and the detailed description thereof will not be repeated.

Referring to FIG. 1, there is shown a perspective view of a MFP (multi function peripheral) according to an embodiment of the present invention. As show in FIG. 1, a MFP 100 includes an ADF (automatic document feeder) 21, an image reader 22, an image forming unit 24, a paper supplying unit 25, and a postprocessing unit 26. ADF 21 handles a plurality of documents mounted on a document tray to transport the documents one after another to image reader 22. Image reader 22 optically reads information of the image, including pictures, letters, drawings, and so on, to acquire image data. When the image data is input, image forming unit 24 forms image on a sheet of paper according to the image data. Image forming unit 24 forms image using four toner colors, including cyan, magenta, yellow and black. Paper supplying unit 25 stores a stock of sheets of paper and supplies them one sheet after another to image forming unit 24. Postprocessing unit 26 discharges the sheets of paper having images formed thereon. Several discharging trays are provided in postprocessing unit 26 to allow the sheets of paper to be sorted before discharging. Postprocessing unit 26 also includes a punching and stapling unit to punch and/or staple the discharged sheets. MFP 100 also includes an operation panel 11 which serve as a user interface operable by a user.

Figure 2:
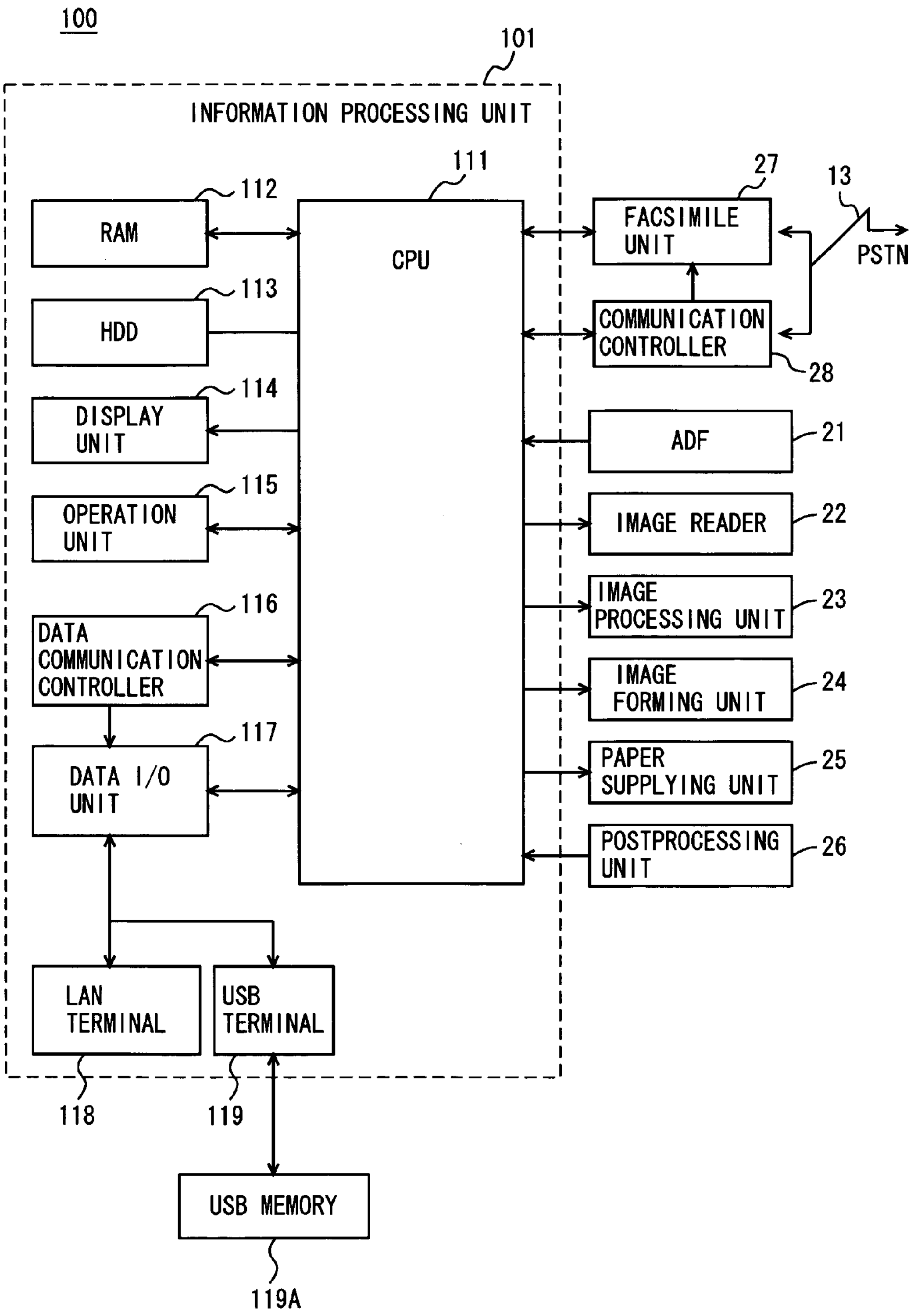
FIG. 2 is a block diagram illustrating an example of a hardware structure of the MFP according to a first embodiment of the present invention.

FIG. 2 is a block diagram of an exemplary hardware structure of the MFP according to the first embodiment. As shown in FIG. 2, MFP 100 includes an information processing unit 101, a facsimile unit 27, a communication controller 28, ADF 21, image reader 22, an image processing unit 23, image forming unit 24, paper supplying unit 25, and postprocessing unit 26. Information processing unit 101 includes a central processing unit (CPU) 111, a random access memory (RAM) 112 which is used as a working area of CPU 111, a hard disc drive (HDD) 113 which stores data in a nonvolatile manner, a display unit 114, an operation unit 115, a data communication controller 116, and a data input/output (I/O) unit 117. CPU 111 is connected to data I/O unit 117, data communication controller 116, operation unit 115, display unit 114, HDD 113, and RAM 112, respectively, in order to control the entire information processing unit 101. CPU 111 is also connected to facsimile unit 27, communication controller 28, ADF 21, image reader 22, image processing unit 23, image forming unit 24, paper supply 25, and postprocessing unit 26, in order to control the entire MFP 100.

Image processing unit 23 is controlled by CPU 111 to apply image processing to the image data in response to an instruction from CPU 111. The image data include image data output from image reader 22 by reading the original document, image data received via data I/O unit 117 from other MFPs or a computer, and image data stored in HDD 113. Image processing includes, for example, enlargement processing to create bigger images, reduction processing to create smaller images, compositing processing to combine multiple images to create a single image, and rotation processing to change the orientation of the image.

Display unit 114 is implemented by a display device such as a liquid crystal display (LCD) and an organic electroluminescence display (EL), and displays a menu of instructions or the information of acquired image data toward users. Operation unit 115 includes a plurality of keys for accepting data including various instructions, letters and numerals by the user operation. Operation unit 115 also includes a touch panel provided on display unit 114. Display unit 114 and operation unit 115 form operation panel 11.

Data communication controller 116 is connected to data I/O unit 117. Data communication controller 116 controls data I/O unit 117 in response to an instruction from CPU 111, and transmits/receives data to and from external devices connected to data I/O unit 117. Data I/O unit 117 includes a LAN terminal 118 and a universal serial bus (USB) terminal 119 which are used to provide communication in accordance with a communication protocol such as a transmission control protocol (TCP) or a file transfer protocol (FTP).

When a LAN cable is connected to LAN terminal 118 in order to connect to a certain network, data communication controller 116 controls data I/O element 117 to communicate with the MFP or a computer connected via LAN terminal 118.

When a certain device is connected to USB terminal 119, data communication controller 116 controls data I/O unit 117 to communicate with the connected device to input/output data. A USB memory 119A including a built-in flash memory can be connected to USB terminal 119. USB memory 119A previously stores a recycling information adding program, which will be described later, so that CPU 111 controls data communication controller 116 to read the recycling information adding program from USB memory 119A, stores it in RAM 112 and executes it.

USB memory 119A is one type of recording medium storing the recycling information adding program, and other medium capable of bearing the program in a fixed manner, such as a flexible disc, cassette tape, an optical disc, compact disc-read only memory (CD-ROM), magnetic optical disc (MO), mini disc (MD), digital versatile disc (DVD), an IC card (including memory card), an optical card, and a semiconductor memory such as mask ROM, erasable programmable ROM (EPROM), and electronically erasable programmable ROM (EEPROM) may be used. Alternatively, CPU 111 may download the recycling information adding program from a computer connected to a certain network and stores it in HDD 113, or the computer connected to the network may write the recycling information adding program in HDD 113. The recycling information adding program stored in HDD 113 is then loaded to RAM 112 and executed by CPU 111. In the present embodiment, the term "program" includes not only a program executable directly by CPU 111, but also other programs such as source-type programs, compressed programs and encrypted programs.

Facsimile unit 27 is connected to PSTN 13 and transmits and/or receives facsimile data to and from PSTN 13. Facsimile unit 27 stores the received facsimile data in HDD 113, while supplying the received data to image forming unit 24 after converting it into print data which is printable in image forming unit 24. In response, image forming unit 24 prints the facsimile data received from facsimile unit 27 on a sheet of paper. Facsimile unit 27 also converts the data stored in HDD 113 into facsimile data and transmits it to a FAX 7 connected to PSTN 13.

Figure 3:
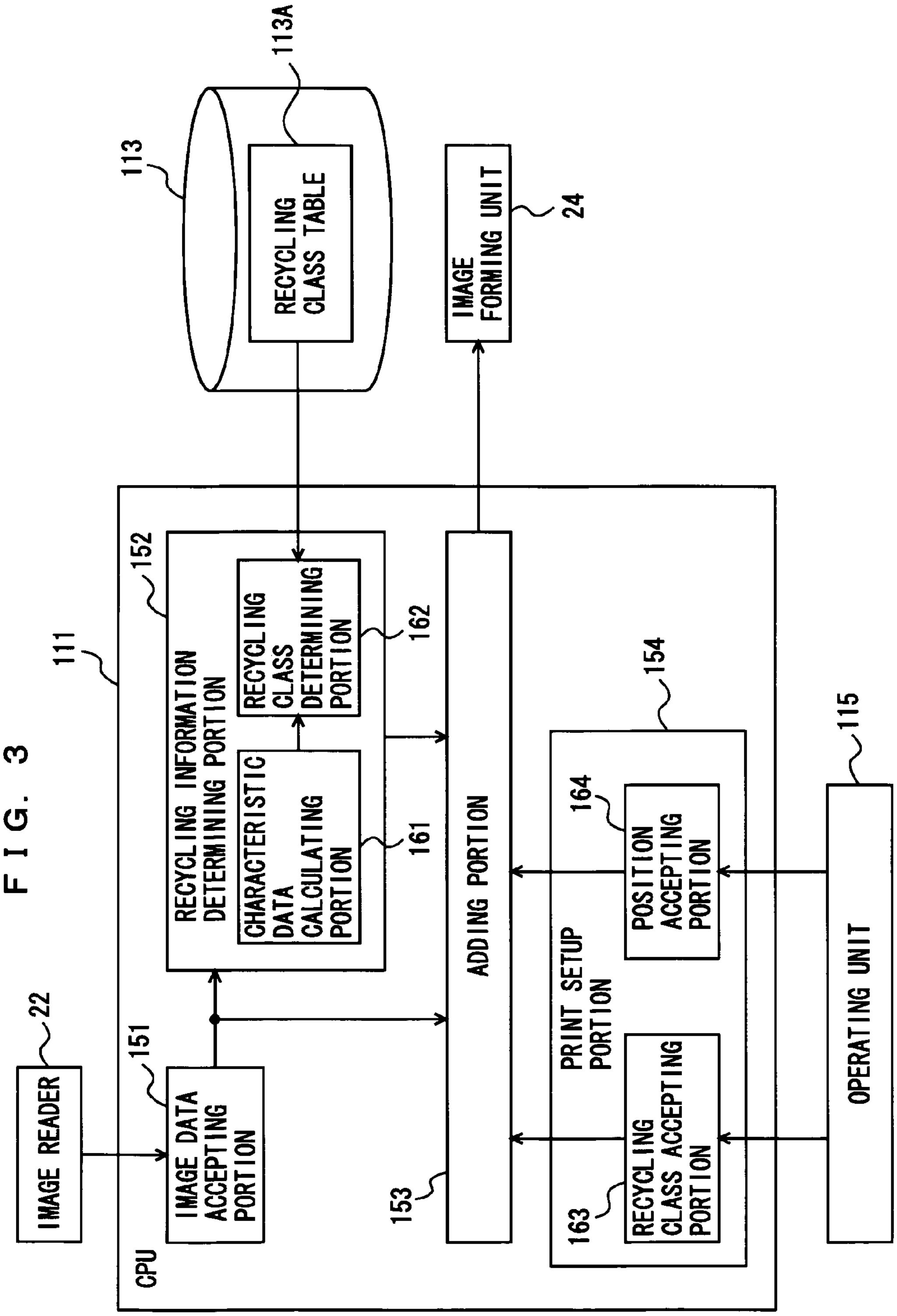
FIG. 3 is a functional block diagram illustrating an overall function of the CPU according to the first embodiment of the present invention.

FIG. 3 is a functional block diagram illustrating an overall function of CPU according to the first embodiment of the present invention. As shown in FIG. 3, CPU 111 includes an image data accepting portion 151 which accepts image data output from image reader 22, a recycling information determining portion 152 which, according to the received image data, determines the recycling information corresponding to the image data, an adding portion 153 which adds the recycling information to the image data, and a print setup portion 154 which accepts printing conditions entered via operation unit 115.

Image data accepting portion 151 receives image data from image reader 22 and outputs the received image data to both recycling information determining portion 152 and adding portion 153. Image data accepting portion 151 may accept the image data stored in HDD 113 or, alternatively, may accept other image data received from other MFPs or computers via data I/O unit 117.

Recycling information determining portion 152 determines the recycling information according to the received image data, and outputs the determined recycling information to adding portion 153. Recycling information determining portion 152 includes a characteristic data calculating portion 161 and a recycling class determining portion 162. The recycling information includes characteristic data and/or recycling class.

According to the image data, characteristic data calculating portion 161 calculates the characteristic data indicating the characteristic of the image data. The characteristic data includes a color ratio, a solid area, a solid ratio, and a monochrome ratio. A color ratio is the number of color pixels of chromatic colors, compared to a total number of pixels of the image data when it is converted into print data in the form of bitmap. If the pixel has an intensity of color greater than a predetermined value, or if the pixel use at least one of cyan, magenta, and yellow toner, the pixel is identified as a color pixel. When an image having a higher color ratio is formed on a recording sheet, it includes more chromatic toner or ink. When the recording sheets include a large amount of chromatic toner or ink in the images formed thereon, it is difficult to produce high quality paper by recycling such recording sheets. Therefore, the color ratio is used to sort out such sheets as the materials for producing low quality paper. A solid area indicates an area of a mass of pixels having a particular density over a predetermined value, when the image data is converted into the print data in the form of bitmap. For example, the solid area may include a mass of pixels having a density of 50%. When an image having a large solid area is formed on a recording sheet, it includes a large amount of toner or ink in a mass. A solid ratio is a proportion of the solid area relative to a total area of one side of the recording sheet. When the recording sheets include a large amount of toner or ink in the images formed thereon, it is difficult to produce high quality paper by recycling such recording sheets. Therefore, the solid ratio is used to sort out such sheets as the materials for producing low quality paper.

A monochrome ratio is a proportion of white pixels relative to black pixels in a monochrome image when the image data is converted into print data in the form of bitmap. If an image having a higher monochrome ratio is formed on a recording sheet, it includes a large amount of black toner. Characteristic data calculating portion 161 may calculate one or more of the color ratio, the solid area, the solid ratio, and the monochrome ratio. In this embodiment, calculating the color ratio and the solid ratio will be described. Characteristic data calculating portion 161 outputs the calculated characteristic data to both recycling group determining portion 162 and adding portion 153.

Recycling class determining portion 162 determines a recycling class according to the characteristic data input from characteristic data calculating portion 161. HDD 113 previously stores a recycling class table 113A. Recycling class table 113A includes classifying data to define a range of characteristic data for each recycling class. Recycling class table 113A is stored in HDD 113 by entering the classifying data by the user from operation unit 115. The recycling class consists of two segments, i.e., colored paper and uncolored paper. Although two segments are provided for the recycling class in this embodiment, it would be sufficient to provide at least two segments. In the description below, recycling class table 113A includes two classifying data. One is for the colored paper, defining a range of the characteristic data as having the color ratio over a threshold value T1, or the color ratio not more than the threshold value T1 and the solid ratio over a threshold value T2. The other is for the uncolored paper, defining a range of the characteristic data as having the color ratio not more than the threshold value T1 and the solid ratio not more than the threshold value T2.

Recycling class determining portion 162 reads the recycling class table 113A to select the recycling class whose range covers the characteristic data entered from characteristic data calculating portion 161, and determines the selected recycling class as the recycling class of the image data. Recycling class determining portion 162 outputs the determined recycling class to adding portion 153.

Print setup portion 154 receives printing conditions from a user who enters a print order to MFP 100 via operation unit 115. Print setup portion 154 outputs the received printing conditions to adding portion 153. Print setup portion 154 displays a print setup screen on display unit 114 of control panel 11. When the user enters the printing conditions to operation unit 115 following the instructions on the print setup screen, print setup portion 154 accepts and sets the printing conditions entered to operation unit 115. The printing conditions include whether or not the recycling information is to be printed, a printing position of the recycling information, and a designated recycling class. Print setup portion 154 includes a recycling class accepting portion 163 to accept the recycling class, and a position accepting portion 164 to accept the specified position where the recycling information is imaged.

Recycling class accepting portion 163 accepts the recycling class entered by the user who enters the print order to MFP 100 via operation unit 115. The recycling class is accepted only when the user designates it when inputting the print order to MFP 100. The recycling class that is designated by the user includes colored paper, uncolored paper, and waste. To print or to not print the recycling information includes whether or not the characteristic data is printed, and/or whether or not the recycling class is printed. If at least one of the characteristic data and the recycling information is set for printing, the printing of the recycling information is set. Recycling class accepting portion 163 outputs the accepted recycling class to adding portion 153. In the following description, the recycling class output from recycling class accepting portion 163 to adding portion 153 will be referred to as a designated recycling class.

Position accepting portion 164 accepts the position of the recycling information to be printed on the sheet of paper, which is entered by the user via operation unit 115. Position accepting portion 164 outputs the accepted printing position to adding portion 153. If the image data includes multiple pages, the image data will be printed on multiple sheets of paper. Position accepting portion 164 accepts information to specify the type of paper on which the recycling information is printed.

If the printing of the recycling information is set in the print setup, adding portion 153 adds the recycling information to the image data supplied from image data accepting portion 151, and outputs the resulting image data to image forming unit 24. Specifically, adding portion 153 converts the image data into print data, and also converts the recycling information into print data. Then, adding portion 153 combines the print data of the recycling information with the print data of the image data to create a combined image in which the recycling information is printed at a position specified in the printing conditions. The combined print data is then output to image forming unit 24. The recycling information includes the characteristic data when the printing of the characteristic data is set in the printing conditions, while the recycling class is included in the recycling information when the printing of the recycling class is set in the printing conditions. As such, the print setup of the printing conditions includes printing one or both of the characteristic data and the recycling class. The recycling information may be provided in letters and symbols which are visually identifiable with human eyes, or may be in the form of bar code. When the recycling information is provided in bar code, adding portion 153 converts the recycling information into bar code. Alternatively, the recycling information may be provided in both letters and bar code, so that the letters and bar code are added to the image data. Further, adding portion 153 may provide the recycling information as a watermark embedded in the image data.

<Duplex Printing>

When the duplex printing mode is set in the printing conditions to form an image on both sides of the sheet of paper, the image data includes multiple pages of data. Recycling information determining portion 152 determines the recycling information for each sheet of paper on which an image is to be formed, rather than determining it for the image data as a whole. Characteristic data calculating portion 161 calculates the characteristic data for each page data of the multiple pages of data in the image data. The characteristic data of respective page data, which are supposed to be imaged on the same sheet of paper, are added together to provide characteristic data of the sheet of paper that the image is to be formed thereon. Hereinafter, the characteristic data of the sheet of paper that the image is to be formed thereon will be referred to as "the sheet characteristic data". Accordingly, characteristic data calculating portion 161 calculates, for one sheet of paper, first characteristic data from the page data that is to be imaged on one side of the sheet, and second characteristic data from the page data that is to be imaged on the other side of the sheet, to make the sheet characteristic data from the first and second characteristic data. Then, characteristic data calculating portion 161 outputs the sheet characteristic data to recycling class determining portion 162, and outputs the first and second characteristic data and the sheet characteristic data to adding portion 153. Alternatively, characteristic data calculating portion 163 may calculate the sheet characteristic data from page data, using the page data that is to be imaged on one side of the sheet of paper and another page data that is to be imaged on the other side of the sheet of paper.

According to the sheet characteristic data, recycling class determining portion 162 determines the recycling class of the sheet of paper that the image is to be formed thereon. Therefore, in the case of forming the image on both sides of the sheet, one recycling class is determined for one sheet of paper.

Adding portion 153 adds the recycling information to the image data supplied from image data accepting portion 151 at a position accepted by position accepting portion 164 and outputs the resulting image data to image forming unit 24. The recycling information may be added to both page data, or may be added to one page data. In the former case, the information may be added in any of the following manner.

<Characteristic Data>

(1) The first or second characteristic data corresponding to each page data is added to each page data. The amount of toner attached to each page is indicated.

(2) The sheet characteristic data is added to each page data. As the sheet characteristic data is indicated on either side of the sheet of paper, the recycling class of the sheet can be judged from the sheet characteristic data by inspecting either side of the sheet.

(3) The sheet characteristic data is added to one of two sides of the page data. As the sheet characteristic data is indicated on one side of the sheet of paper, the recycling class of the sheet can be judged from the sheet characteristic data by inspecting the one side of the sheet.

<Recycling Class>

(1) The recycling class is added to each page data. Sorting the sheets of paper is facilitated because the recycling class can be confirmed visually by inspecting either side of the sheet of paper.

(2) The recycling class is added to one of two sides of the page data. The sheets of paper can be sorted because the recycling class can be confirmed visually by inspecting one side of the sheet.

Figure 4:
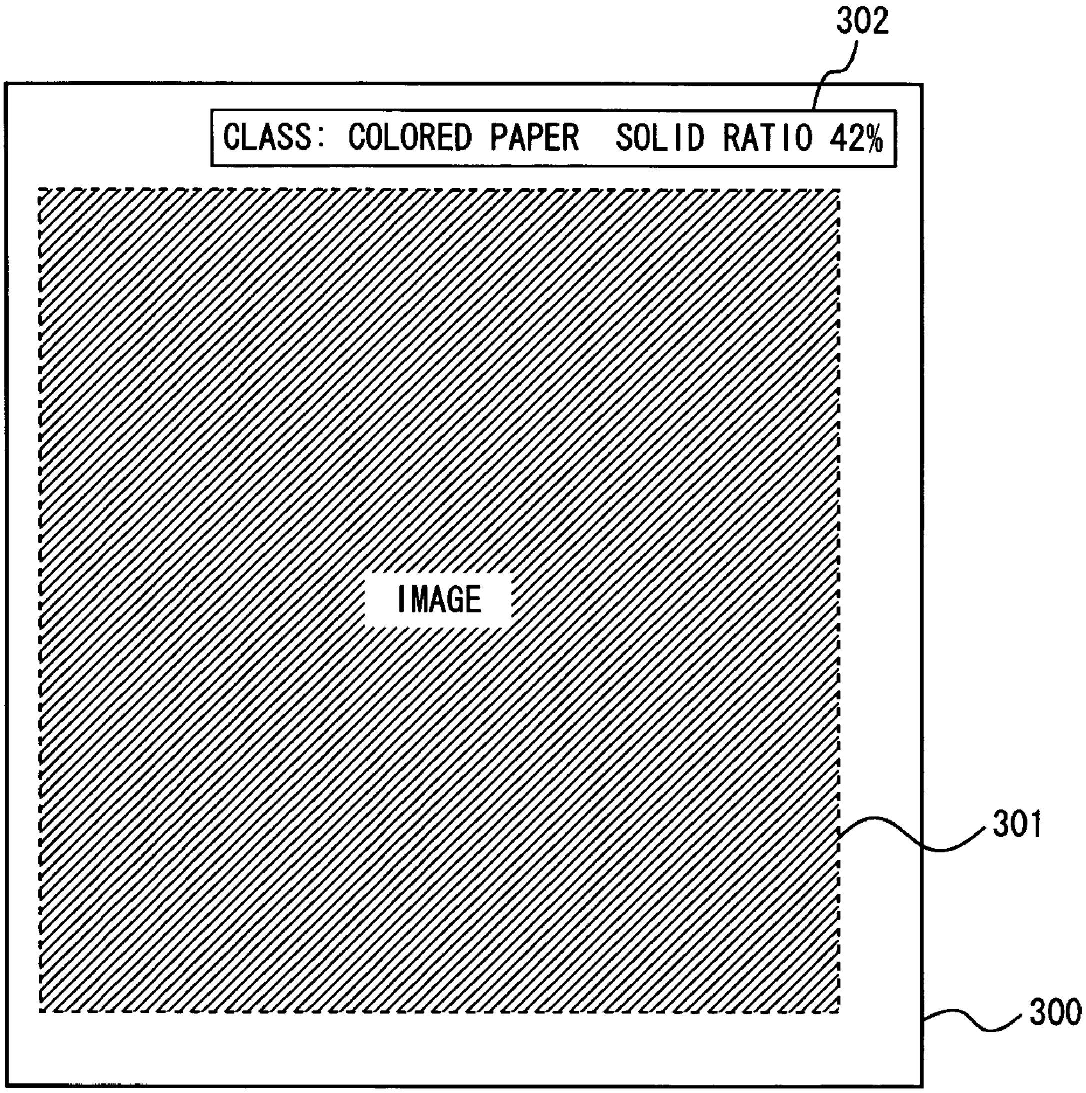
FIG. 4 is an example of a sheet of paper having an image formed thereon with the recycling information added to the image.

Referring to FIG. 4, there is shown an example of a sheet of paper on which the image is formed with the recycling information added thereto. In FIG. 4, the image is formed according to the printing conditions: (1) to print the characteristic data, (2) to print the recycling class, and (3) to print the recycling information in the upper right corner of the sheet. As shown in FIG. 4, a sheet of paper 300 includes an area 301 where the image data is rendered into an image, and an area 302 where the recycling information is rendered into an image in the upper right corner of the sheet 300. The word "image" is shown in area 301, indicating that the image of the image data is formed therein. Area 302 includes the words "colored paper" to indicate the recycling class, and the words "solid ratio 42%" to indicate the characteristic data. Sorting is facilitated because the user can visually inspect the recycling class of the sheet of paper 300. The user also can visually inspect the characteristic data to learn the amount of toner accumulated in sheet 300.

Figure 5A:
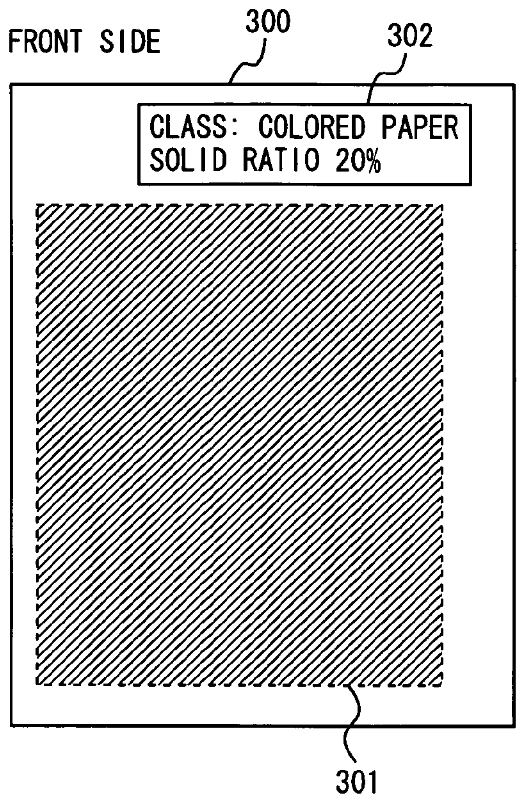
FIGS. 5(A) and (B) illustrate an example of a sheet of paper in the case of duplex printing, having an image is formed thereon with the recycling information added to the image.
Figure 5B:
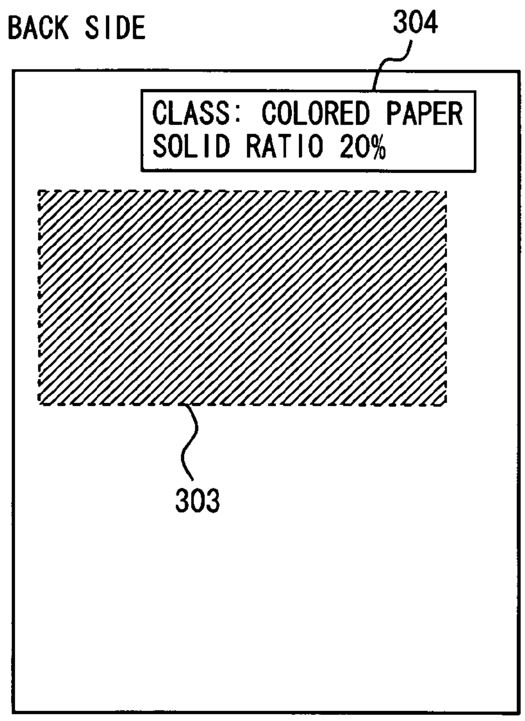

FIGS. 5A and 5B illustrate an example of a sheet of paper in the case of duplex printing, on which the image is formed with the recycling information added thereto, where FIG. 5A is a front side and FIG. 5B is a back side of the sheet of paper. In this example, the solid ratio of an image 301 on the front side is 20%, and the solid ratio is also 20% for an image 303 formed on the back side of the sheet. Therefore, a recycling information area 302 that is imaged on the front side includes the characteristic data in the form of the letters "solid ratio 20%", while a recycling information area 304 that is imaged on the back side also includes the characteristic data in the form of the letters "solid ratio 20%". Because it is assumed in this example that the sheets of paper having the solid ratio not more than 35% fall in the recycling class of uncolored paper, both front and back sides of the sheet are classified as uncolored paper as having the solid ratio of 20%. However, because the recycling class is determined according to the sheet characteristic data that is a sum of the characteristic data for each side of the sheet in the duplex printing, the sheet characteristic data of sheet 300 is determined to 40%, indicating the recycling class of colored paper. As a result, the recycling information areas 302 and 304 imaged on the front and back sides, respectively, include the letters "recycling class: colored paper".

Figure 6:
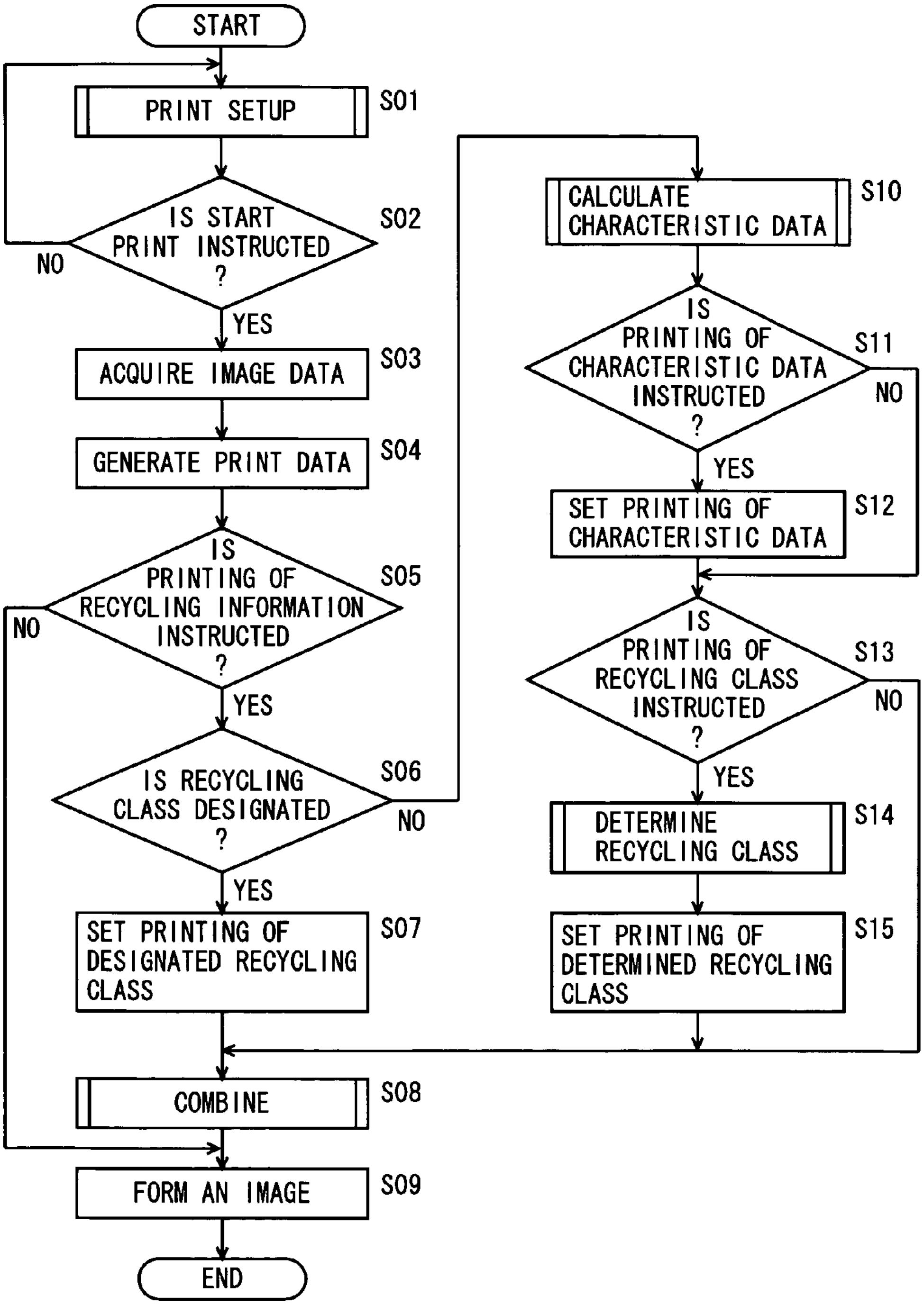
FIG. 6 is a flow chart illustrating an example of a recycling information adding procedure.
Figure 7:
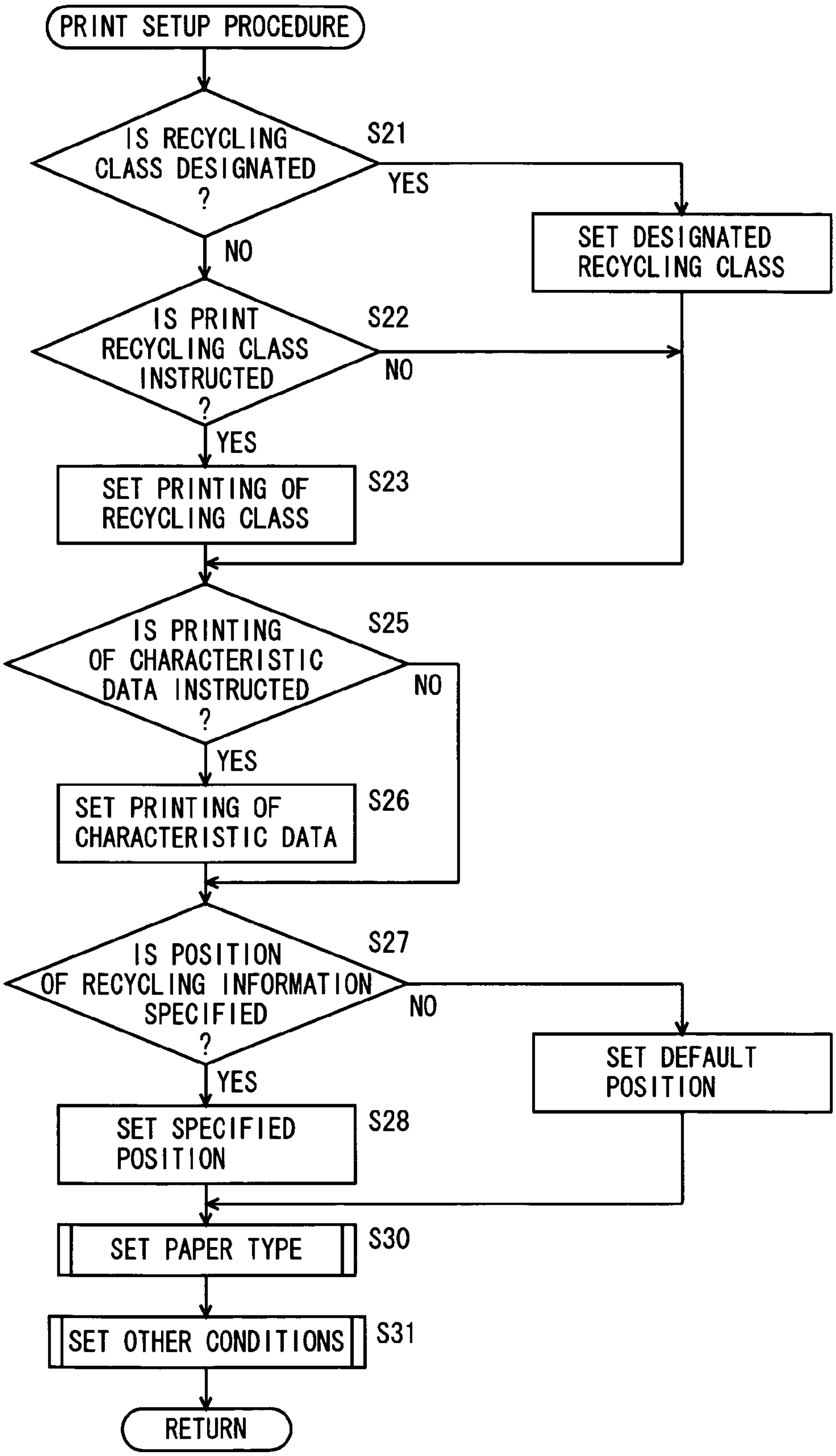
FIG. 7 is a flow chart illustrating an example of a print setup procedure.

Referring to FIG. 6, there is shown a flow chart illustrating an exemplary recycling information adding procedure executed in the CPU. As shown in FIG. 6, CPU 111 executes the print setup procedure (step S01) which will be described below. FIG. 7 is a flow chart illustrating an exemplary print setup procedure. The print setup procedure is a process to accept the printing conditions entered by the user via operation unit 115 by following the instructions on the print setup screen displayed on display unit 114 to set the printing conditions. Referring to FIG. 7, the print setup procedure determines whether or not the recycling class is designated (step S21). If the recycling class is designated, it (the designated recycling class) is set in the printing conditions (step S24). Through this step, the user can determine the recycling class at his/her will by specifying either colored paper or uncolored paper. After the designated recycling class is set, the process proceeds to step S25.

If the recycling class is not designated (NO at step S21), it is determined whether or not printing the recycling class is instructed (step S22). If the printing of the recycling class is instructed, the printing of the recycling class is set (step S23) and the process proceeds to step S25. If the printing of the recycling class is not instructed, the process proceeds to step S25 without setting the printing of the recycling class in the printing conditions. In step S25, it is determined whether or not printing the characteristic data is instructed. If the printing of the characteristic data is instructed, the printing of the characteristic data is set (step S26), and the process proceeds to step S27. If the printing of the characteristic data is not instructed, the process proceeds to step S27 without setting the printing of the characteristic data in the printing conditions.

In step S27, it is determined whether or not a position to print the recycling information on the sheet of paper is specified, and if the position is specified, the specified position is set in the printing conditions (step S28). If the position is not specified, a default position is set in the printing conditions (step S29). In this example, the default position is in the upper right corner of the sheet of paper.

In step S30, the step of setting the type of paper is executed (step S30). The step of setting the type of paper is to accept a selected paper tray among several paper trays included in paper supply 25. Then, other settings for the printing conditions are accepted (step S31). Other printing conditions include, for example, instructing the duplex printing to form an image on both side of the sheet of paper, specifying an enlargement or reduction ratio of the image, instructing to staple, punch, and/or sort the sheets of paper, and so on.

Referring back to FIG. 6, the user completes the setup of printing conditions and determines whether or not an instruction to start printing is received (step S02). If the pushing down of the start button in operation unit 115 is detected, it is determined that start printing is instructed and the process proceeds to S03. If the pushing down of the start button is not detected, the process returns to step S01 where the print setup procedure is executed. In step S03, the original document is read by image reader 22 to acquire image data. The acquired image data is converted into bitmap data to create print data (step S04).

Then, it is determined whether or not an instruction to print recycling information is received (step S05). If, in the print setup procedure of step S01, the recycling class is designated, the printing of the recycling class is set, or the printing of the characteristic data is set in the printing conditions, it is determined that the printing of the recycling information is instructed and the process proceeds to step S06. If none of these conditions is set in the printing conditions, the process proceeds to step S09. In step S09, the print data generated in step S04 is printed by image forming unit 24.

In step S06, it is determined whether or not the recycling class is designated in the printing conditions. If the recycling class is designated, the process proceeds to step S07. If the recycling class is not designated, the process proceeds to step S10. In step S07, the designated recycling class that has been designated in the printing conditions is set as the class to be printed, and the process proceeds to step S08. By setting the designated recycling class as the class to be printed, it is possible to consider the intention of the user to form the image of the recycling class on the sheet of paper, which is advantageous, for example, when the user wants to designate the recycling class as waste. In step S08, the combined image is created, which will be describe later.

In the meantime, in step S10, the characteristic data is calculated, which will be described later. Then, it is determined whether or not printing the characteristic data is set in the printing conditions that have been set in step S01 (step S11). If the printing of the characteristic data is set, the characteristic data calculated in step S10 is set as the characteristic data to be printed (step S12). If the printing of the characteristic data is not set, step S12 is skipped and the process proceeds to step S13.

In step S13, it is determined whether or not printing the recycling class is set in the printing conditions that have been set in step S01. If the printing of the recycling class is set, the process proceeds to step S14, otherwise the process proceeds to step S08. In step S14, the recycling class is determined from the characteristic data calculated in step S10. Then, the determined recycling class is set as the recycling class to be printed (step S15) and the process proceeds to step S08 where the combined image is created.

In step S09, image forming unit 24 renders image of the combined print data created in step S08 formed by combining the print data created in step S04 with the image of the characteristic data or the recycling class.

Figure 8:
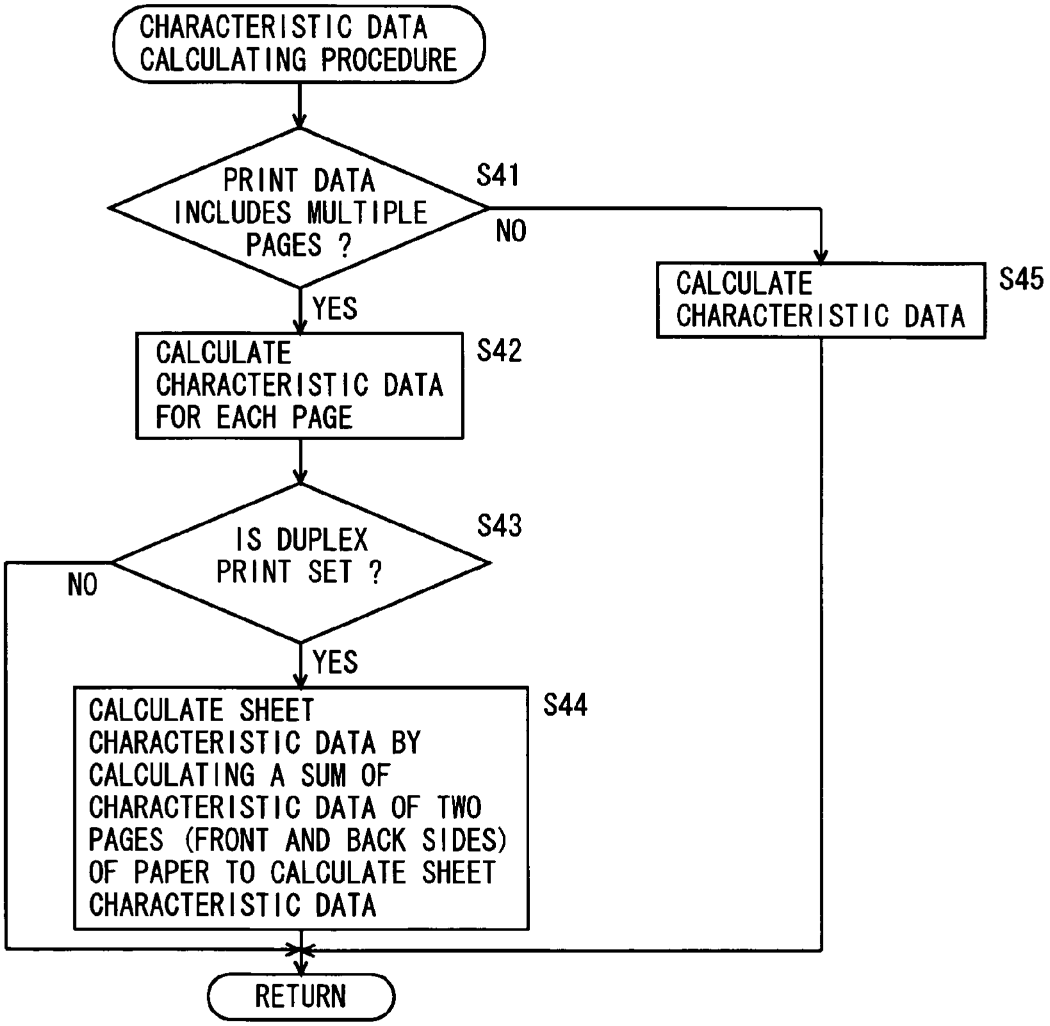
FIG. 8 is a flow chart illustrating an example of a characteristic data calculating procedure.

Referring to FIG. 8, there is shown a flow chart illustrating an exemplary characteristic data calculating procedure. The characteristic data calculating procedure is executed in step S10 of FIG. 6. As shown in FIG. 8, CPU 111 determines whether or not the print data includes multiple pages (step S41). If multiple pages are included, the process proceeds to step S42. If only one page is included, the process proceeds to step S45. In step S42, the characteristic data is calculated for each page of the multiple pages of the print data. The characteristic data may be at least one of a color ratio, a solid area, a solid ratio, and a monochrome ratio, and the solid ratio is used here as the characteristic data. Then, it is determined whether or not the duplex printing is set in the printing conditions (step S43). If the duplex printing is set, the process proceeds to step S44. If the duplex printing is not set, step S44 is skipped and the process ends. In step S44, the sheet characteristic data is determined by calculating a sum of the characteristic data of front and back sides of the page to be imaged on the same sheet of paper. In step S45, the characteristic data is calculated from the entire print data and the process ends.

In this characteristic data calculating procedure, if the duplex printing is set in the printing conditions, the sheet characteristic data is determined by calculating a sum of the characteristic data of front and back sides of the page to be imaged on the same sheet. Because the sheet characteristic data that indicates the amount of toner attached to one sheet of paper is calculated in the case of duplex printing where both side of the sheet are printed, the sheet characteristic data can be understood as indicating an accurate amount of toner attached to the sheet of paper. If the duplex printing is not set in the printing conditions, the characteristic data of the image data to be printed on one side of the sheet of paper is provided as the sheet characteristic data, and the sheet characteristic data is, again, understood as indicating an accurate amount of toner attached to the sheet of paper. It is noted that although the sheet characteristic data is determined by calculating a sum of the characteristic data of front and back of the page to be imaged on the same sheet, the sheet characteristic data may be provided as one of the characteristic data of front and back sides of the page to be imaged on the same sheet, having a larger value than the other. Alternatively, the characteristic data may be an average value of the characteristic data of both sides of the page to be imaged on the same sheet of paper.

Figure 9:
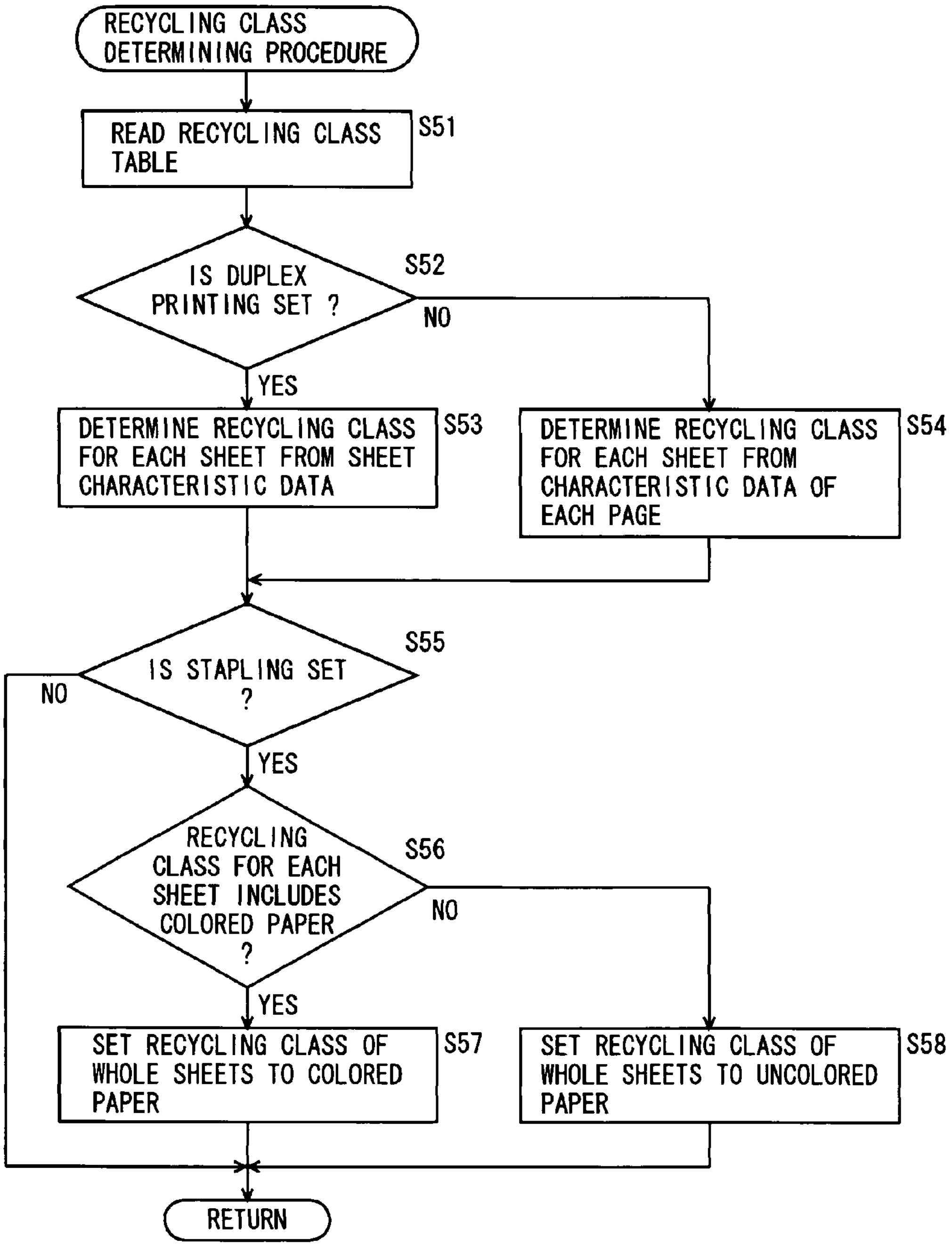
FIG. 9 is a flow chart illustrating an example of a recycling class determining procedure.

Referring to FIG. 9, there is shown a flow chart illustrating an exemplary recycling class determining procedure. The recycling class determining procedure is executed in step S14 of FIG. 6. As shown in FIG. 9, CPU 111 reads the recycling class table 113A from HDD 113 (step S51), and determines whether or not the duplex printing is set in the printing conditions during the print setup procedure (step S52). If the duplex printing is set, the process proceeds to step S53. If the duplex printing is not set, the process proceeds to step S54. In step S53, the recycling class is determined for each sheet of paper according to the sheet characteristic data. Specifically, the classifying data that defines a range of characteristic data including the sheet characteristic data is extracted from recycling class table 113A read out in step S51, and the recycling class of the extracted classifying data is determined. In step S54, the recycling class is determined for each sheet of paper according to the characteristic data of each page data. Specifically, the classifying data that defines a range of characteristic data including the characteristic data of each page data is extracted from recycling class table 113A read out in step S51, and the recycling class of the extracted classifying data is determined.

In step S55, it is determined whether or not the stapling is set in the printing conditions during the print setup procedure. If the stapling is set, the process proceeds to step S56. If the stapling is not set, the process proceeds to step S58. In step S56, it is determined whether or not at least one recycling class is determined as colored paper among the recycling class of respective sheets of paper determined in step S53 or S54. If at least one recycling class is colored paper, the process proceeds to step S57, otherwise the process proceeds to step S58. In step S57, the recycling class of the multiple sheets of paper as a whole is set to colored paper, while it is set to uncolored paper in step S58, and the process ends.

In the recycling class determining procedure, the recycling class is determined according to the sheet characteristic data calculated for each sheet of paper in the characteristic data calculating procedure. Because the recycling class is thus determined from the sheet characteristic data that indicates an accurate amount of toner attached to the sheet, it is possible to determine the proper recycling class. If the stapling is set, multiple pages of sheets are stapled together to form a bundle, and the recycling class is determined for the bundle of sheets as a whole. If at least one sheet of paper of the multiple sheets of paper is classified as colored paper, the recycling class of the multiple sheets as a whole is also classified as colored paper, which enables to provide the accurate information in determining the recycling class when classifying the bundles of multiple sheets of paper.

Figure 10:
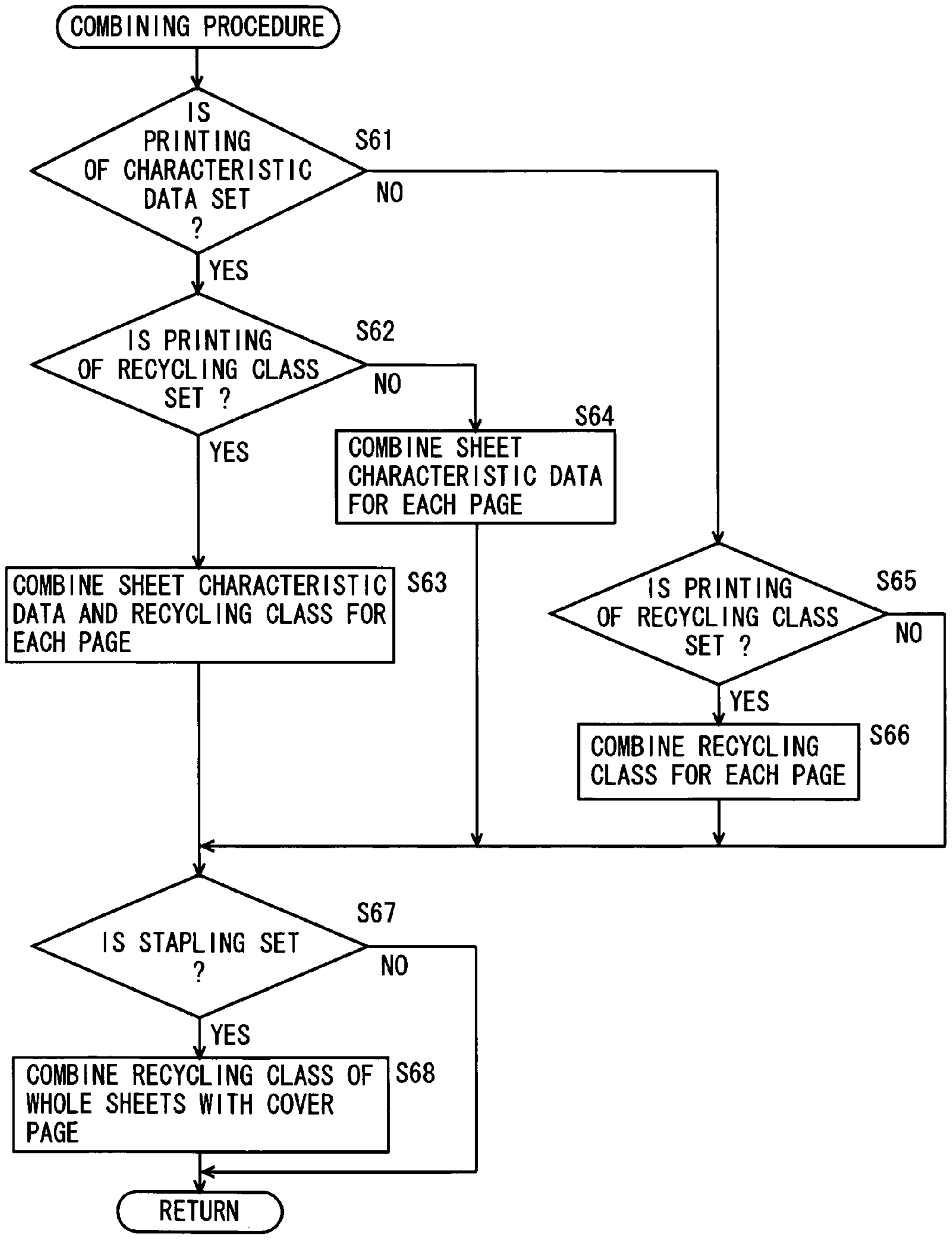
FIG. 10 is a flow chart illustrating an example of a combining procedure.

Referring to FIG. 10, there is shown a flow chart illustrating an exemplary combining procedure. The combining procedure is executed in step S08 of FIG. 6. As shown in FIG. 10, CPU 111 determines whether or not printing the characteristic data is set in the printing conditions during the print setup procedure (step S61) and, if the printing of the characteristic data is set, the process proceeds to step S62. If the printing of the characteristic data is not set, the process proceeds to step S65. In step S62, it is determined whether or not printing the recycling class is set in the printing conditions during the print setup procedure. If the printing of the recycling class is set, the process proceeds to step S63. If the printing of the recycling class is not set, the process proceeds to step S64. In step S63, the combining processing is applied to the sheet characteristic data and the recycling class for each page, and then the process proceeds to step S67. Specifically, the sheet characteristic data is converted into the bitmap data, and the recycling class is also converted into the bitmap data, to thereby combining the converted sheet characteristic data with the recycling class over the print data generated in step S04 at a position specified in the printing conditions of the print data. In step S64, the combining processing is applied to the sheet characteristic data for each page and the process proceeds to step S67. Specifically, the sheet characteristic data is converted into the bitmap data to combine the converted sheet characteristic with the print data generated in step S04 of FIG. 6 at a position specified in the printing conditions of the print data.

In step S65, it is determined whether or not printing the recycling class is set in the printing conditions. If the printing of the recycling class is set, the process proceeds to step S66. If the printing of the recycling class is not set, step S66 is skipped and the process proceeds to step S67. In step S66, the combining processing is applied to the recycling class for each page and the process proceeds to step S67. Specifically, the recycling class is converted into the bitmap data to combine the converted recycling class with the print data generated in step S04 of FIG. 6 at a position specified in the printing conditions of the print data.

In step S67, it is determined whether or not the stapling is set in the printing conditions. If the stapling is set, the process proceeds to step S68. If the stapling is not set, step S68 is skipped and the process ends. In step S68, the combining processing is applied to the recycling class of the whole sheets of paper on the cover page of the print data. Specifically, the recycling class set in either step S57 or S58 of FIG. 9 is converted into the bitmap data to combine the recycling class of the whole sheets of paper with the print data at a position specified in the printing conditions of the cover page of the print data. It is noted that the recycling class of the whole sheets of paper is imaged on the cover page in this example, but it would be sufficient to put it at least on one page of the multiple sheets of paper.

As such, in the case of the duplex printing, the sheet characteristic data is combined with the print data of both sides, and the recycling class determined from the sheet characteristic data is also combined with the print data of both sides during the combining procedure. This facilitates the visual inspection of the recycling class, because both the sheet characteristic data indicating the amount of toner attached to each side of the sheet of paper and the recycling class determined from the sheet characteristic data are imaged on both sides of the sheet. Alternatively, the recycling class may be combined with only one side of the print data, so that the recycling class is printed only on one side of the sheet of paper. In this case, the characteristic data may be combined with each side of the print data, instead of the sheet characteristic data, so that the characteristic data calculated from the page data is printed on each side of the print data.

As described above, MFP 100 according to the first embodiment of the present invention determines the recycling information corresponding to the image data, and forms an image by adding the recycling information to the image data. The sorting job of the sheets of paper for recycling can be facilitated, because the recycling information is imaged in addition to the image of the image data.

In addition, MFP 100 calculates the characteristic data that indicates the characteristic of the image as the recycling information, and forms an image of the characteristic data indicating the characteristic of the image data. The sorting job of the sheets of paper for recycling can be further facilitated, because the sheets of paper are sorted according to the characteristic data.

Further, MFP 100 determines the recycling class as the recycling information according to the characteristic data, and forms an image of the recycling class. The sorting job of the sheets of paper for recycling can be further facilitated, because the class of the sheet of paper is known by visually inspecting the recycling class.

In the case of the duplex printing, a single piece of recycling information (such as the sheet characteristic data or the recycling class) is determined from two pages of data that are to be imaged on both sides of one sheet of paper. Because the single piece of recycling information is determined for one sheet of paper, the erroneous sorting of the sheets having the image formed only on one side thereof can be prevented.

If the stapling is set, the characteristic data of each page data of the multiple pages of the image data is determined, and one recycling class is determined for the entire image data. Because one recycling class is determined for the multiple sheets of paper that are stapled together into a bundle, and is imaged on the cover sheet of the bundle, the erroneous sorting of the sheets can be prevented in sorting the bundled sheets of paper that are stapled together.

Second Embodiment

In a second embodiment, a MPF 100A forms an image on "back paper" by adding the characteristic data and the recycling class to the image data. The term "back paper" refers to a sheet of paper having an image previously printed on one side thereof, and the printed image becomes unnecessary. MFP 100A of the second embodiment differs from MFP 100 of the first embodiment mentioned above in the respects described below.

Figure 11:
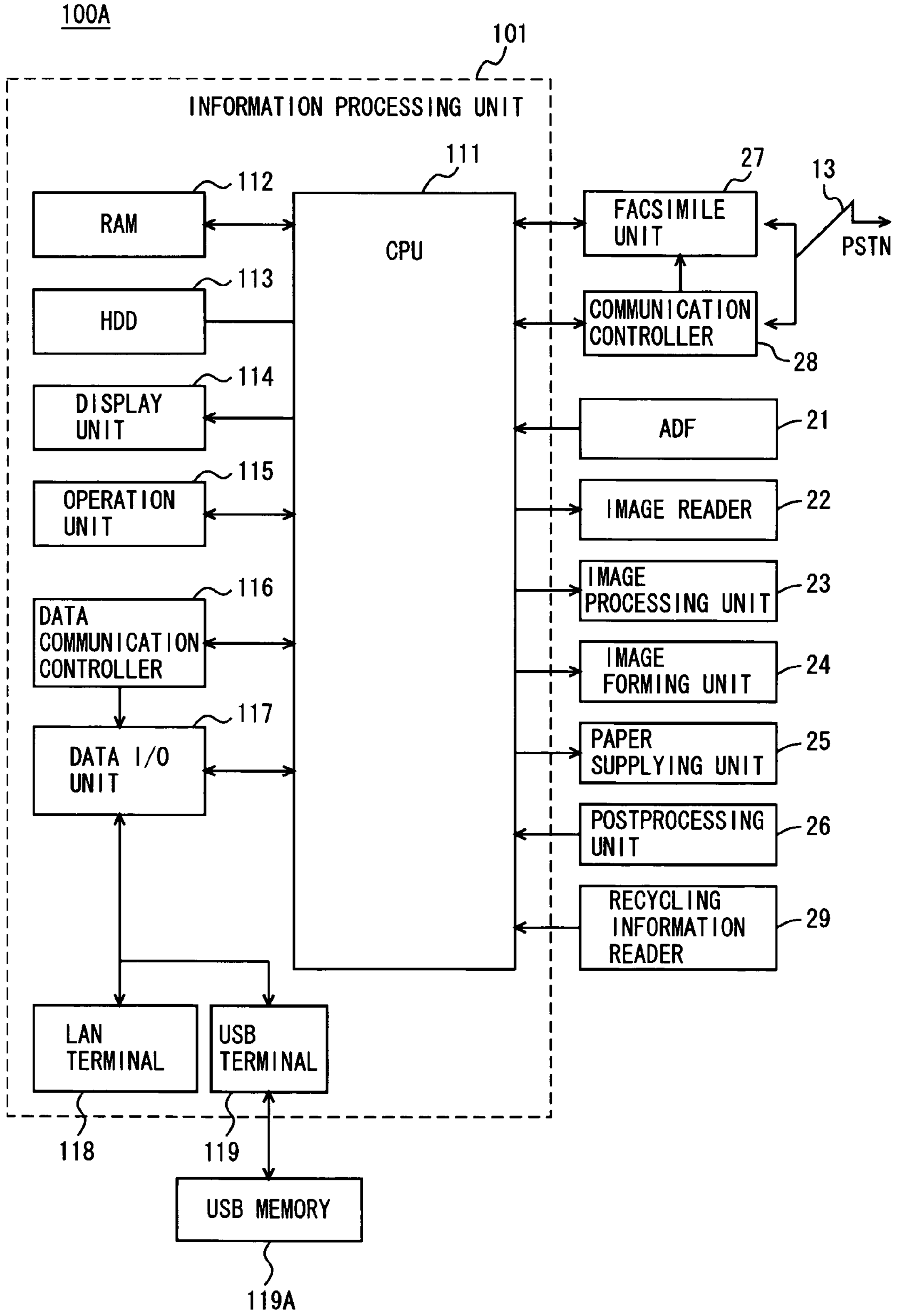
FIG. 11 is a block diagram illustrating an example of a hardware structure of a MFP according to a second embodiment of the present invention.

Referring to FIG. 11, there is shown a block diagram illustrating an exemplary hardware structure of the MFP according to the second embodiment of the present invention. The MFP of the second embodiment differs from MFP 100 of the first embodiment in that a recycling information reader 29 is added. Recycling information reader 29 is a sensor capable of reading images, so that it reads the recycling information that is imaged on the sheets of paper while they are transported from paper supply 25 to image forming unit 24. When the recycling information is imaged on the sheet of paper after converted into bar code, a bar code reader is used as the recycling information reader. When the imaged recycling information is provided in letters, a line sensor or a two dimensional sensor may be used. Recycling information reader 29 is connected to CPU 111 to read the recycling information and output it to CPU 111.

Figure 12:
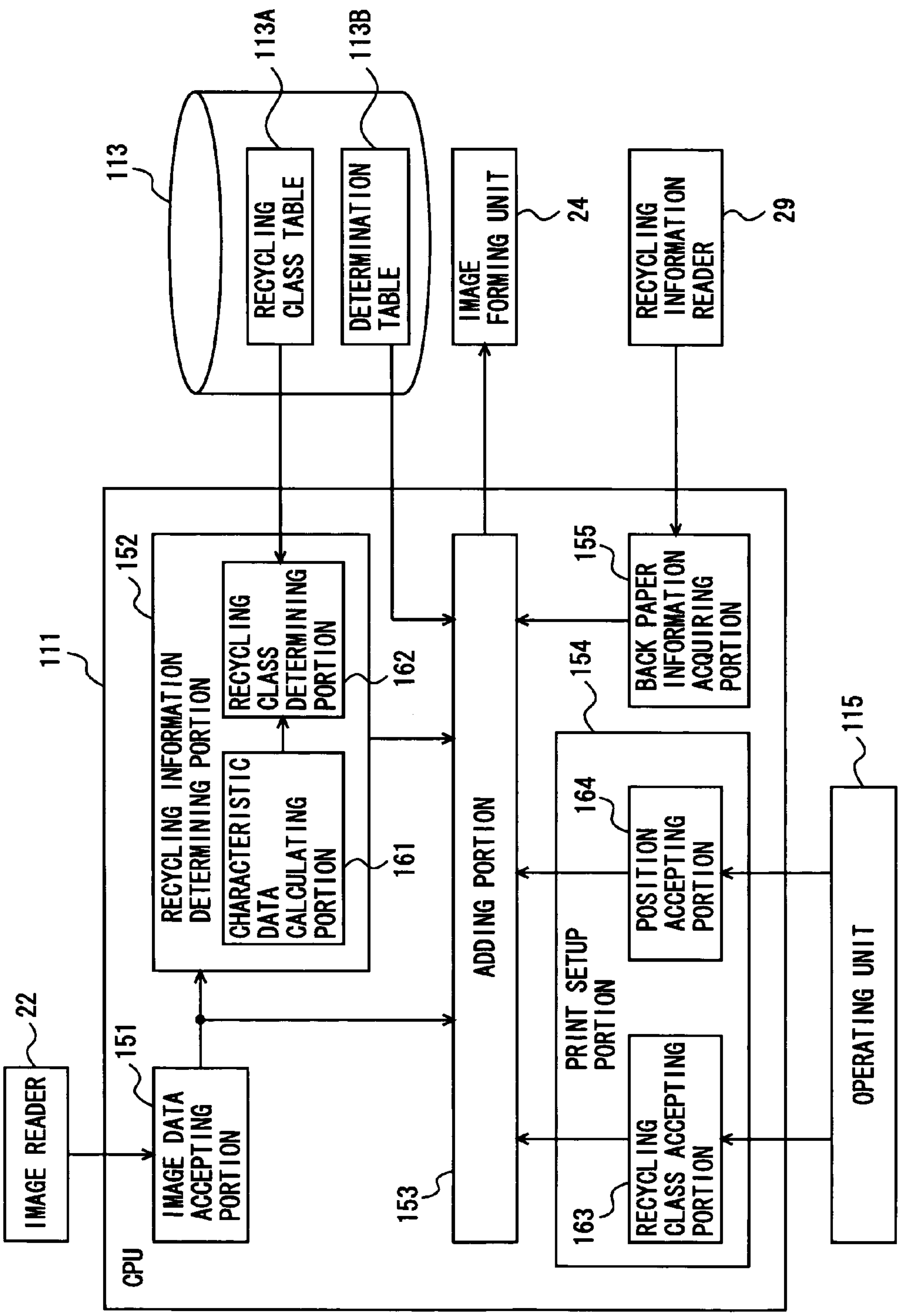
FIG. 12 is a functional block diagram illustrating an overall function of the CPU according to the second embodiment.

FIG. 12 is a functional block diagram illustrating an overall function of the CPU according to the second embodiment. As shown in FIG. 12, a back paper information acquiring portion 155 is added to the structure shown in FIG. 3. Back paper information acquiring portion 155 acquires the recycling information of the back paper received from recycling information reader 29. Back paper information acquiring portion 155 outputs the acquired recycling information of the back paper to adding portion 153. It is noted that back paper information acquiring portion 155 acquires the recycling information of the back paper from recycling information reader 29 in this embodiment, but the paper trays that exclusively store colored paper or uncolored paper, respectively, may be provided in paper supplying unit 25 among other paper trays, so that the recycling information can be retrieved from the paper tray designated by the user during the print setup. For example, if the user designates the paper tray storing colored paper during the print setup, the recycling class of colored paper is output to adding portion 153. If the user designates the paper tray storing uncolored paper during the print setup, the recycling class of uncolored paper is output to adding portion 153. Alternatively, it is also possible to input the recycling information by the user when he/she enters the print settings from operation unit 115, and that back paper information acquiring portion 155 acquires the recycling information from operation unit 115. In these cases, recycling information reader 29 can be omitted.

Adding portion 153 determines new recycling information to be imaged, according to the recycling information determined in recycling information determining portion 152 and the recycling information of the back paper input from back paper information acquiring portion 155. Specifically, when the characteristic data is input from back paper information acquiring portion 155, the characteristic data calculated in characteristic data calculating portion 161 and the characteristic data input from back paper information acquiring portion 155 are added together to calculate the sheet characteristic data, in a manner similar to calculating the sheet characteristic data in the duplex printing described above. In addition, the recycling class of the sheet of paper is determined from the calculated sheet characteristic data.

Instead of the characteristic data, if the recycling class is input from back paper information acquiring portion 155, only the recycling class of the sheet is determined because the sheet characteristic data is cannot be calculated. According to the recycling class determined in recycling class determining portion 162 and the recycling class of the back paper supplied from back paper information acquiring portion 155, a new recycling class is determined using determination table 113B stored previously in HDD 113.

FIG. 13 is an example of the determination table. Referring to FIG. 13, the recycling class output from back paper information acquiring portion 155 is indicated as "recycling class of back paper", and the recycling class determined in recycling class determining portion 162 is indicated as "recycling class of image data". If at least one of the recycling class of the back paper and the recycling class of the image data is colored paper, the new recycling class is determined as colored paper. In other words, the new recycling class will be uncolored paper only when both the recycling class of the back paper and the recycling class of the image data are uncolored paper.

Figure 14:
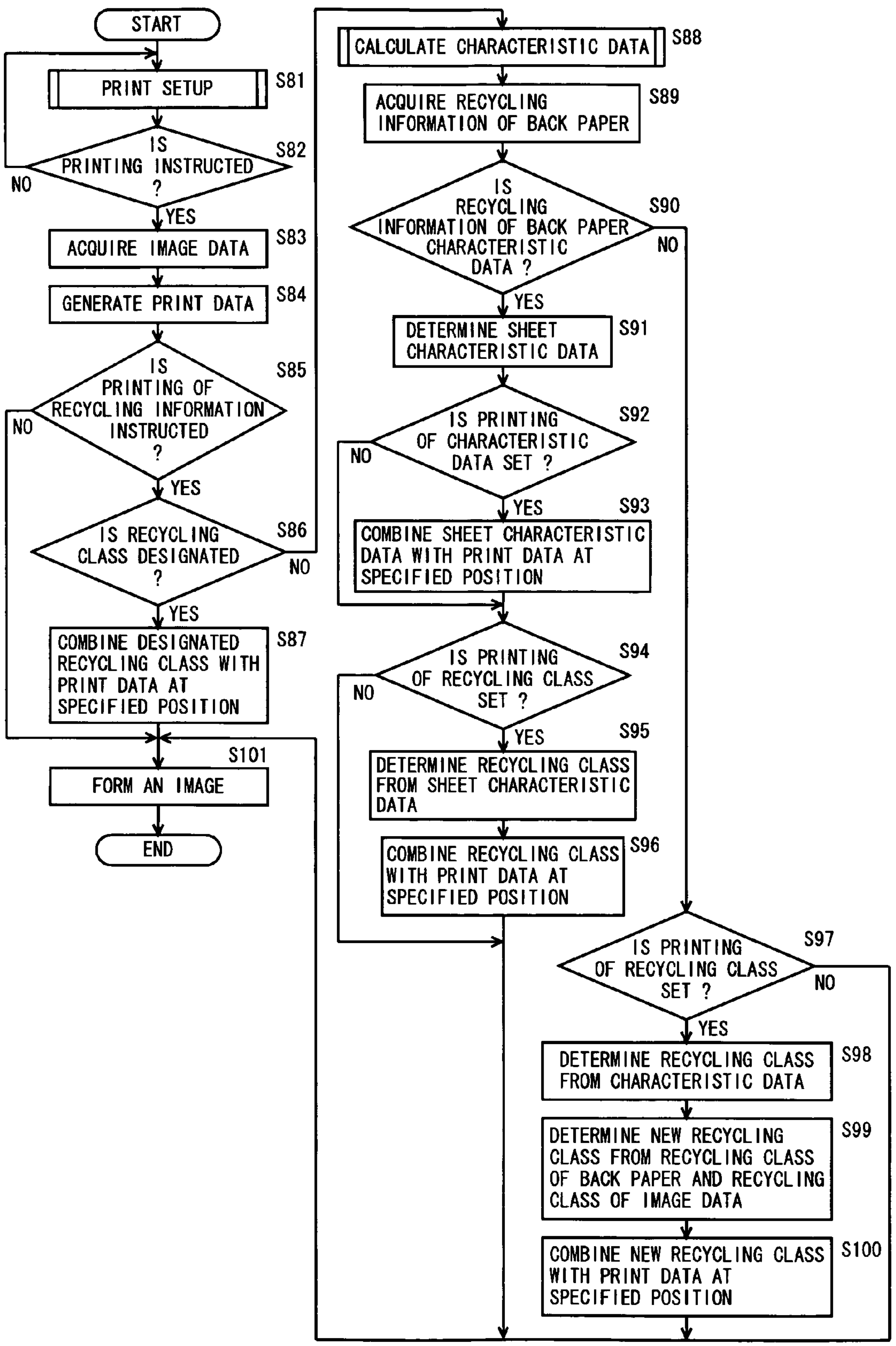
FIG. 14 is a flow chart illustrating another recycling information adding procedure executed in the CPU.

Referring to FIG. 14, there is shown an exemplary flow chart illustrating another embodiment of the recycling information adding procedure executed in the CPU. As shown in FIG. 14, the steps S81 through S86 are the same as those executed in steps S01 through S06 of FIG. 6, and the description thereof will not be repeated. In step S87, CPU101 combines the recycling class designated in the printing conditions with the print data at a position specified in the printing conditions of the print data generated in step S84. Specifically, the process proceeds to step S87 when the recycling class is designated by the user during the print setup in step S81. In this case, the recycling class designated by the user is converted into the bitmap data, to combine the bitmap data of the recycling class with the bitmap data generated in step S84 at a specified position thereof. Thus, it is possible to consider the intention of the user to form the image of the recycling class on the sheet of paper, which is advantageous, for example, when the user designates the recycling class of waste.

In step S88, the characteristic data calculating procedure as shown in FIG. 8 is executed. It is noted, however, that because the back paper is used for image forming in the second embodiment, the duplex printing will not be set in the print conditions and step S44 is ignored.

In step S89, the recycling information of the back paper is acquired. CPU 111 acquires the recycling information of the back paper input from back paper information acquiring portion 155. Then, it is determined whether or not the acquired recycling information of the back paper includes the characteristic data (step S90). If the recycling information of the back paper includes the characteristic data, the process proceeds to step S91, otherwise the process proceeds to step S97. In step S91, the sheet characteristic data is determined from the characteristic data of the image data calculated in step S88 and the characteristic data included in the recycling information of the back paper. Specifically, the sheet characteristic data is determined by calculating a sum of the characteristic data of the image data and the characteristic data included in the recycling information of the back paper. Subsequently, in step S92, it is determined whether or not printing of the characteristic data is set in the printing conditions. If the printing of the characteristic data is set, the process proceeds to step S93, otherwise step S93 is skipped and the process proceeds to step S94. In step S93, the sheet characteristic data is converted into the bitmap data, and the converted sheet characteristic data is combined with the print data generated in step S84 at a position specified in the printing conditions of the print data. In step S94, it is determined whether or not printing of the recycling class is set in the printing conditions. If the printing of the recycling class is set, the process proceeds to step S95, otherwise the step proceeds to step S101. In step S95, the recycling class is determined from the sheet characteristic data. Specifically, recycling class table 113A is read from HDD 113, and the classifying data that defines a range of characteristic data including the sheet characteristic data is extracted from recycling class table 113A, and the recycling class of the extracted classifying data is determined. The determined recycling class is then converted into the bitmap data, and the converted recycling class is combined with the print data generated in step S84 at a position specified in the printing conditions of the print data (step S96). Then, the process proceeds to step S101.

In the meantime, if the recycling information of the back paper only includes the recycling class, the process proceeds to step S97. In this case, it is determined whether or not printing of the recycling class is set in the printing conditions. If the printing of the recycling class is set in the printing conditions, the process proceeds to step S98, otherwise the process proceeds to step S101. In step S98, the recycling class is determined from the characteristic data calculated in step S88. Subsequently, in step S99, a new recycling class is determined from the recycling class of the back paper and the recycling class of the image data determined in step S98. Specifically, determination table 113B is read from HDD 113, and a new recycling class is determined from the determination table 113B corresponding to the recycling class of the back paper and the recycling class of the image data. Then, the newly determined recycling class is converted into the bitmap data and the converted new recycling class is combined with the print data generated in step S84 at a position specified in the printing conditions of the print data (step S100). Then, the process proceeds to step S101.

In step 101, the image of the print data is formed by image forming unit 24. If the print data includes at least one of the sheet characteristic data and the recycling class, it is imaged with the image data.

As described in the above, MFP 100 of the second embodiment acquires the recycling information of the image formed on the back paper that is to be used for forming the image of the image data, and determines the new recycling information from both the acquired recycling information and the recycling information determined from the image data to be formed. Therefore, when the new image is formed on the back paper having the image already formed on one side thereof, the recycling information is determined from the image to be formed on both sides of the back paper. As a result, it is possible to form the image of the image data with the proper recycling information when the image is formed on the back paper.

Third Embodiment

In a third embodiment, a MFP 100B stores the sheets of paper in paper supply 25, that include a memory, such as an IC tag, which is capable of storing data in a nonvolatile manner. When forming the image, MFP 100B writes the recycling information acquired from the image data in the memory. If it is desired to use the back paper, the recycling information is read from the memory of the back paper.

Figure 15:
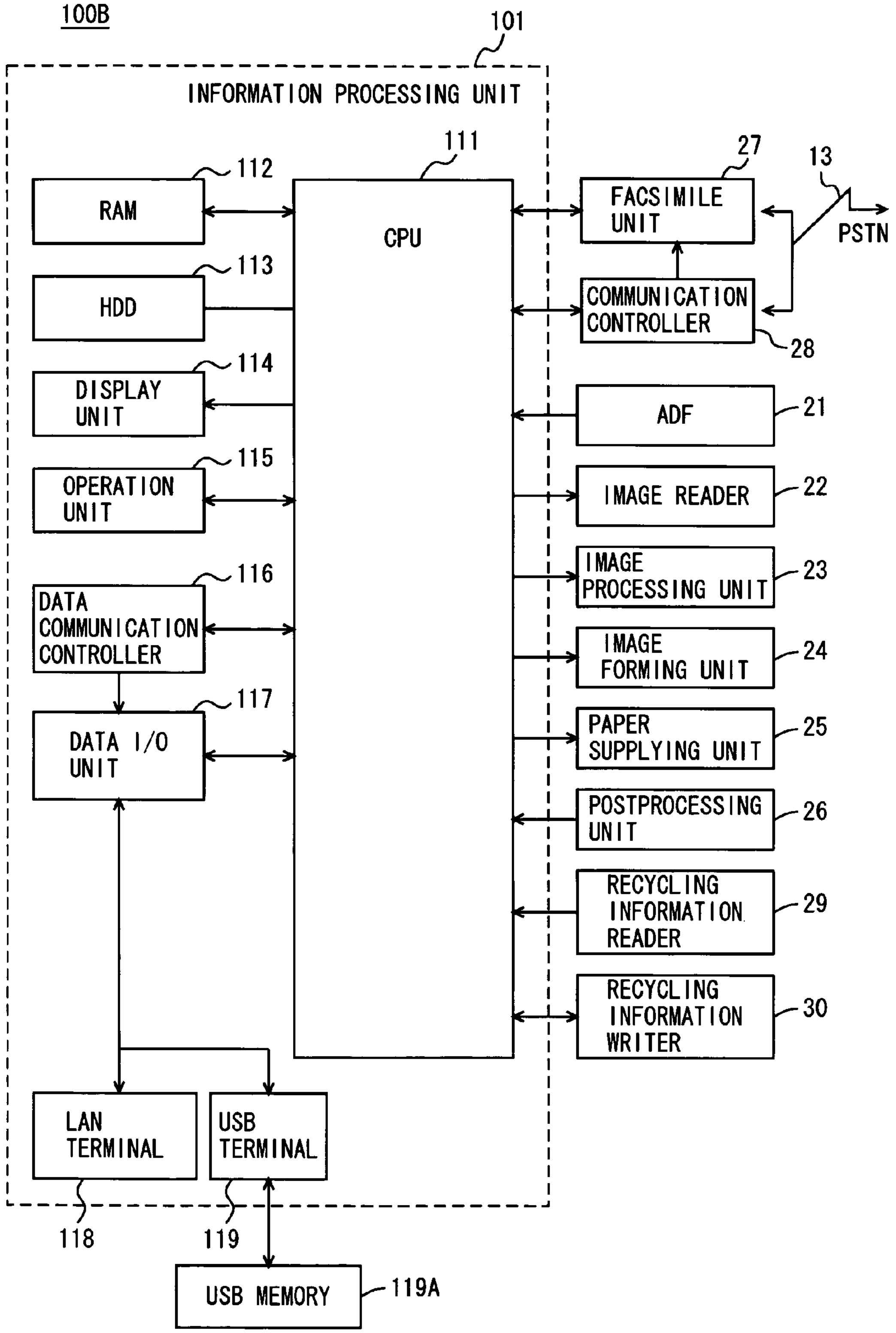
FIG. 15 is a block diagram illustrating an example of a hardware structure of a MFP according to a third embodiment.

FIG. 15 is a block diagram illustrating an exemplary hardware structure of the MFP according to the third embodiment. As shown in FIG. 15, a recycling information writer 30 is added to MFP 100A of the second embodiment shown in FIG. 11.

Recycling information reader 29 and recycling information writer 30 are capable of establishing wireless communication with the memory stored in the sheet of paper, where recycling information reader 29 reads the recycling information from the memory and recycling information writer 30 writes the recycling information to the memory. Recycling information writer 30 is arranged in the vicinity of the sheet transporting path between the image forming unit 24 and postprocessing unit 26, and writes the recycling information to the memory of the sheet after the image is formed thereon by image forming unit 24.

In the third embodiment, CPU 111 of MFP 100B executes the same steps as those shown in FIG. 14, except that recycling information reader 29 acquires the recycling information of the back paper by reading it from the memory stored in the back paper. Further, steps S87, S93, S96 and S100 are omitted, and in a new step subsequent to step S101, recycling information writer 30 writes the recycling class to the memory of the back paper.

As described above, MFP 100B of the third embodiment determines the recycling information corresponding to the image data, and writes the determined recycling information in the memory stored in the sheet of paper on which the image is to be formed. The sheets of paper are sorted for recycling by reading the recycling information from the memory.

It is noted that in the above embodiments, MFP 100 is described as the image forming apparatus, but it is apparent that the present invention may be implemented as the method and/or the program product to add recycling information to cause the image forming apparatus to execute the procedures shown in FIGS. 6-10 and 14.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:

an image data acquiring portion to acquire image data;

a recycling information determining portion to determine recycling information corresponding to said image data, said recycling information including a recycling class of said image data, said recycling information determining portion including a recycling class determining portion to determine the recycling class according to at least a comparison of a color ratio of said image data to a first threshold value and a comparison of a solid ratio of said image data to a second threshold value; and an image forming portion to form an image of said image data on a sheet of paper together with said recycling information.

2. An image forming apparatus according to claim 1, further comprising an accepting portion to accept an input of the recycling class, wherein said recycling information determining portion determines said accepted recycling class as said recycling information, preceding said recycling class determined by said recycling class determining portion.

3. An image forming apparatus according to claim 1, further comprising:

a position accepting portion to accept a designation of a position where said recycling information is imaged on a sheet of paper; and an adding portion to add said recycling information to said image data in a manner that said recycling information is imaged at said designated position.

4. An image forming apparatus according to claim 1, wherein said image data includes at least two pages of data, and said recycling information determining portion determines a single piece of recycling information from the two pages of data that is to be imaged on both sides of a sheet of paper by said image forming portion in the duplex printing mode where an image is formed on both sides of a sheet of paper.

5. An image forming apparatus according to claim 4, further comprising an adding portion to add said determined recycling information to the page data of front and back pages, respectively, that is to be imaged on both sides of the sheet of paper by said image forming portion.

6. An image forming apparatus according to claim 4, further comprising an adding portion to add said calculated recycling information to the page data that is to be imaged on one side of the sheet of paper by said image forming portion.

7. An image forming apparatus according to claim 1, wherein said image data includes multiple pages of data, and said recycling information determining portion includes a page recycling information determining portion to determine the recycling information for each page data of said multiple pages of data, and an image data recycling information determining portion to determine a single piece of recycling information for said image data, according to said recycling information determined for each page data of said multiple pages of data by said page recycling information determining portion.

8. An image forming apparatus according to claim 7, further comprising an adding portion to add said determined recycling information to at least one of said multiple pages of data.

9. An image forming apparatus according to claim 1, further comprising a back paper recycling information acquiring portion to acquire the recycling information of an image which is previously formed on a sheet of paper on which said image data is to be formed, wherein said recycling information determining portion includes a back paper recycling information determining portion to determine new recycling information from said acquired recycling information and said determined recycling information.

10. An image forming apparatus according to claim 9, wherein said back paper recycling information acquiring portion includes a recycling information reading portion to read the recycling information of the image that is previously imaged on the sheet of paper on which said image data is to be formed.

11. An image forming apparatus according to claim 9, wherein said back paper recycling information acquiring portion includes a recycling information reading portion to read the recycling information that is previously stored corresponding to the sheet of paper on which said image data is to be formed.

12. An image forming apparatus according to claim 1, further comprising a bar code converter to convert the recycling information of said image data into bar code, and an adding portion to add said bar code to said image data.

13. An image forming apparatus according to claim 1, further comprising a embedding portion to embed said determined recycling information in said image data as a watermark.

14. An image forming apparatus, comprising:

an image data acquiring portion to acquire image data;

an image forming portion to form an image of said image data on a sheet of paper having a memory which is capable of recording the data in a nonvolatile manner;

a recycling information determining portion to determine recycling information corresponding to said image data, said recycling information including a recycling class of said image data, said recycling information determining portion including a recycling class determining portion to determine the recycling class according to at least a comparison of a color ratio of said image data to a first threshold value and a comparison of a solid ratio of said image data to a second threshold value; and a writing portion to write said determined recycling information to said memory in the sheet of paper on which said image data is to be formed.

15. A method of adding recycling information, comprising the steps of:

acquiring image data;

determining recycling information corresponding to said image data, said recycling information including a recycling class of said image data, said recycling class being determined according to at least a comparison of a color ratio of said image data to a first threshold value and a comparison of a solid ratio of said image data to a second threshold value; and forming an image of said image data on a sheet of paper together with said recycling information.

16. A non-transitory computer readable recording medium having a computer program stored thereon which, when executed, causes a computer to execute the steps of:

acquiring image data;

determining recycling information corresponding to said image data, said recycling information including a recycling class of said image data, said recycling class being determined according to at least a comparison of a color ratio of said image data to a first threshold value and a comparison of a solid ratio of said image data to a second threshold value; and forming an image of said image data on a sheet of paper together with said recycling information.

17. An image forming apparatus, comprising:

an image data acquiring portion to acquire image data;

a characteristic data calculating portion to calculate characteristic data indicating a characteristic of said image data, wherein said characteristic data is calculated according to at least a comparison of a color ratio of said image data to a first threshold value and a comparison of a solid ratio of said image data to a second threshold value;

a recycling class determining portion to determine a recycling class according to said calculated characteristic data;

a back paper recycling information acquiring portion to acquire a recycling information of an image which is previously formed on a sheet of paper on which said image data is to be formed;

a recycling information determining portion to determine new recycling information from said determined recycling class and said acquired recycling information; and an image forming portion to form an image of said image data on a sheet of paper together with said new recycling information.

18. An image forming apparatus according to claim 17, wherein said back paper recycling information acquiring portion includes a recycling information reading portion to read the recycling information of the image that is previously imaged on the sheet of paper on which said image data is to be formed.

19. An image forming apparatus according to claim 18, wherein said back paper recycling information acquiring portion includes a recycling information reading portion to read the recycling information that is previously stored corresponding to the sheet of paper on which said image data is to be formed.

* * * * *